United States Patent Office 3,830,805
Patented Aug. 20, 1974

3,830,805
CONTROL OF UNWANTED PLANTS USING
1-BENZYLIDENEAMINO-2-HYDANTOINS
Kurt H. Pilgram, Modesto, Calif., assignor to
Shell Oil Company
Filed Feb. 23, 1973, Ser. No. 335,200
Int. Cl. C07d 49/32
U.S. Cl. 260—240 F    3 Claims

ABSTRACT OF THE DISCLOSURE 1-(3-(trifluoromethyl)- and 1-(3-(trifluoromethoxy)benzylideneamino)hydantoins, useful for controlling unwanted plants.

DESCRIPTION OF THE INVENTION

The novel compounds of this invention are represented by the formula

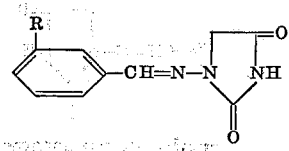

wherein R is CF$_3$— or CF$_3$O—. It has been found that these two compounds are active herbicides with respect to a variety of economically significant species of plants.

It has been found, in contrast, that 1-benzylideneamino-2-hydantoin, known in the art, is a poor herbicide, wih a limited spectrum of activity. 1-bezylideneamino-2-hydantoin is disclosed in Gut et al., Collection of Czechoslovak Chemical Communications, volume 33, pages 2087-2096 (1968) (in English) (Chemical Abstracts, volume 19, page 3361, item number 36029e (1968)).

For use as herbicides, the compounds of this invention can be applied by conventional techniques, employing conventional formulations.

The amount of the hydantoin required for controlling unwanted plants will naturally depend upon the variety or varieties of plants involved, whether the herbicide is to be applied pre-emergence or post-emergence, the kind and condition of the soil (if applied preemergence) or the condition of the plants (if applied post-emergence), the degree of control desired, the character of the formulation used, the mode of application, the climate, the season of the year and other variables which must be and are taken into account in conventional practice. Recommendation as to precise dosages are therefore not possible. In general, however, when applied pre-emergence to a locus to be protected, dosages of from about 0.1 to about 10 pounds per acre of the hydantoin will be satisfactory. When applied post-emergence, the usual practice is to spray or dust the foliage of the plants to apply the needed dosage to the foliage. The nominal dosage in this case also is from about 0.1 to about 10 pounds per acre of the hydantoin.

The hydantoins may be formulated as wettable powders, dusts, granules, solutions, emulsifiable concentrates, emulsions, suspension concentrates and aerosols. Wettable powders are usually compounded to contain from about 25% to about 75% by weight of toxicant and usually contain in addition to solid carrier, 3–10% by weight of a dispersing agent and, where necessary, up to 10% by weight of stabilizer(s) and/or other additives such as penetrants or stickers. Dusts are usually formulated as a concentrate having a similar composition to that of a wettable powder but without a dispersant, and are diluted in the field with further solid carrier to give a composition usually containing ½–10% by weight of toxicant. Generally, granules will contain ½–25% by weight toxicant and 0–10% by weight of additives such as stabilizers, slow release modifiers and binding agents. Emulsifiable concentrates usually contain, in addition to the solvent and, when necessary, co-solvent, 10–50% weight per volume toxicant, 2–20% weight per volume emulsifiers and 0–20% weight per volume of appropriate additives such as stabilizers, penetrants and corrosion inhibitors. Suspension conecentrates are compounded so as so as to obtain a stable, non-sedimenting flowable product and usually contain 10–75% by weight of toxicant, 0.5–15% by weight of dispersing agents, 0.1–10% by weight of suspending agents such as protective colloids and thioxotropic agents, 0–10% by weight of appropriate additives such as defoamers, corrosion inhibitors, stabilizers, penetrants and stickers, and as carrier, water on an organic liquid in which the toxicant is substantially insoluble; certain organic solids or inorganic salts may be dissolved in the carrier to assist in preventing sedimentation or as antifreeze agents for water.

Aqueous dispersions and emulsions of the formulations are obtained by diulting such wettable powders or concentrates with water. The said emulsions may be of the water-in-oil or of the oil-in-water type, and may have a thick mayonnaise-like consistency.

The compositions containing the hydantoin may also contain other ingredients, for example, other compounds possessing pesticidal, especially insecticidal, acaricidal, herbicdal or fungicidal properties.

Preparation of the compounds of the invention is illustrated in the following examples. In all cases the identities of the products were confirmed by elemental, nuclear magnetic resonance and infrared spectral analyses.

EXAMPLE 1.—1-3-(trifluoromethyl)benzylidene-amino)hydantoin (I)

To a solution of 3.2 grams of 1-aminohydantoin hemisulfate (which can be prepared as described on page 2095 of Gut et al. supra) in 40 milliliters of water and 10 milliliters of ethanol was added 3.5 grams of 3-(trifluoromethyl)benzaldehyde (Filler et al., *J. Org. Chem.* 25, 733 (1960); *J. Am. Chem. Soc.* 68, 426 (1946)) and five drops of concentrated hydrochloric acid. this mixture was stirred for 2 hours at room temperature, cooled to 10° C. and filtered. The filter cake was recrystallized twice from methanol to give I as a colorless crystalline solid, melting point: 223–225° C.

EXAMPLE 2.—1-(3-(trifluoromethoxy)benzylidene-amino)hydantoin (II)

(a) 1-(3-(trifluoromethoxy)benzoyl)imidazole (IIA)

To a stirred solution of 40.5 grams of N,N'-carbonyldiimidazole (prepared from imidazole and phosgene using the method of *Chem. Berichte* 95, 1280 (1962)) in 400 milliliters of tetrahydrofuran was added dropwise at 20° C a solution of 51.5 grams of 3-(trifluromethoxy)benzoic acid (prepared using the method of Yagupolskii et al., *J. Gen. Chem.* (U.S.S.R.), English Translation, *31*, 845 (1961)) dissolved in 200 milliliters of tetrahydrofuran. After CO$_2$ evolution ceased, the reaction mixture was concentrated to dryness under reduced pressure. The product was extracted with cyclohexane, and the extract concentrated to yield 56.7 grams of (IIA) as a colorless oil.

(b) 3-(trifluoromethoxy)benzaldehyde (IIB)

A solution of 3.5 grams of lithium aluminum hydride in 1 liter of tetrahydrofuran was added dropwise with stirring over a period of 30 minutes at −20° C. to a solution of 56.5 grams of (IIA) prepared in (a) above. After standing for 2 hours the reaction mixture was concentrated under reduced pressure. The residue, dissolved in methanol, was acidified with sulfuric acid and diluted with methanol to a volume of 700 milliliters.

(c) II

To a solution of 11.5 grams of 1-aminohydantoin hemisulfate in 200 milliliters of water was added a solution of (IIB) in 300 milliliters of methanol freshly prepared as in (b). The resulting solution was stirred for 3 hours at room temperature, then was concentrated to 200 milliliters by evaporation of the solvent. The resulting solid was filtered and recrystallized from methanol to give (II) as a white crystalline solid, melting point: 197–199° C.

The herbicidal activity of compounds of this invention was determined with respect to several common species of weeds, by spraying a formulation of the test compound on to the soil in which the weed seeds had been planted (pre-emergence test) or on to the foliage of the plants (post-emergence tests). In each series of tests, the soil was held in containers that isolated that soil into a narrow band, or row. The solution of test chemical was sprayed over the band, from one end to the other, the concentration of the test compound in the formulation varying logarithmically from a higher value at one end of the band to a lower value at the other end of the band. The effect of the test chemical was evaluated visually and reported as the nominal rate of application, in pounds of test chemical per acre of the soil band, at which 90% inhibition of the growth of the weeds occurred, this being referred to as the 90% growth inhibition, or $GI_{90}$, dosage.

Results of the pre-emergence tests, as well as the weed species involved, are set out in Table I, while similar data for the post-emergence tests are set out in Table II.

TABLE I.—PRE-EMERGENCE TESTS

| Compound of example | Weed species | | | | | | | |
|---|---|---|---|---|---|---|---|---|
| | Ryegrass | Cheatgrass | Crabgrass | Water grass | Pigweed | Mustard | Sowthistle | Curly dock |
| 1 | 9.0 | 4.5 | 0.35 | 0.8 | 0.25 | 0.35 | 0.45 | 0.45 |
| 2 | >5.0 | 2.6 | <0.5 | >5.0 | 0.5 | <0.5 | | <0.5 |
| (*) | >5 | >5 | >5 | >5 | 1.0 | 1.7 | 3.5 | >5 |

*1-benzylideneamino-2-hydantoin, for comparison.

TABLE II.—POST-EMERGENCE TESTS

| Compound of example | Weed species | | | | | | | |
|---|---|---|---|---|---|---|---|---|
| | Ryegrass | Cheatgrass | Crabgrass | Water grass | Pigweed | Mustard | Sowthistle | Curly dock |
| 1 | 9.0 | 8.0 | 8.0 | 9.0 | <1.0 | <1.0 | 8.0 | 1.3 |
| 2 | | >10 | >10 | >10 | <1.0 | <1.0 | | <1.0 |
| (*) | | >10 | >10 | >10 | >10 | >10 | | >10 |

*1-benzylideneaminohydantoin, for comparison.

I claim as my invention:

1. A compound of the formula

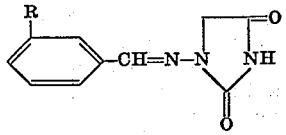

wherein R is trifluoromethyl or trifluoromethoxy.

2. A compound according to claim 1 where R is trifluoromethyl.

3. A compound according to claim 1 wherein R is trifluoromethoxy.

References Cited

UNITED STATES PATENTS 3,746,704   7/1973   Kollmeyer et al. ___ 260—240 F

OTHER REFERENCES

Chemical Abstracts, vol. 50, col. 2553 (1960) (abst. of Uoda et al).

Chemical Abstracts, vol. 67, abst. No. 3281z (1967).

JOHN D. RANDOLPH, Primary Examiner

U.S. Cl. X.R.

71—92; 260—309, 309.5, 600